Aug. 15, 1933.  J. L. MARTIN  1,922,968
HOSE COUPLING
Original Filed June 6, 1927
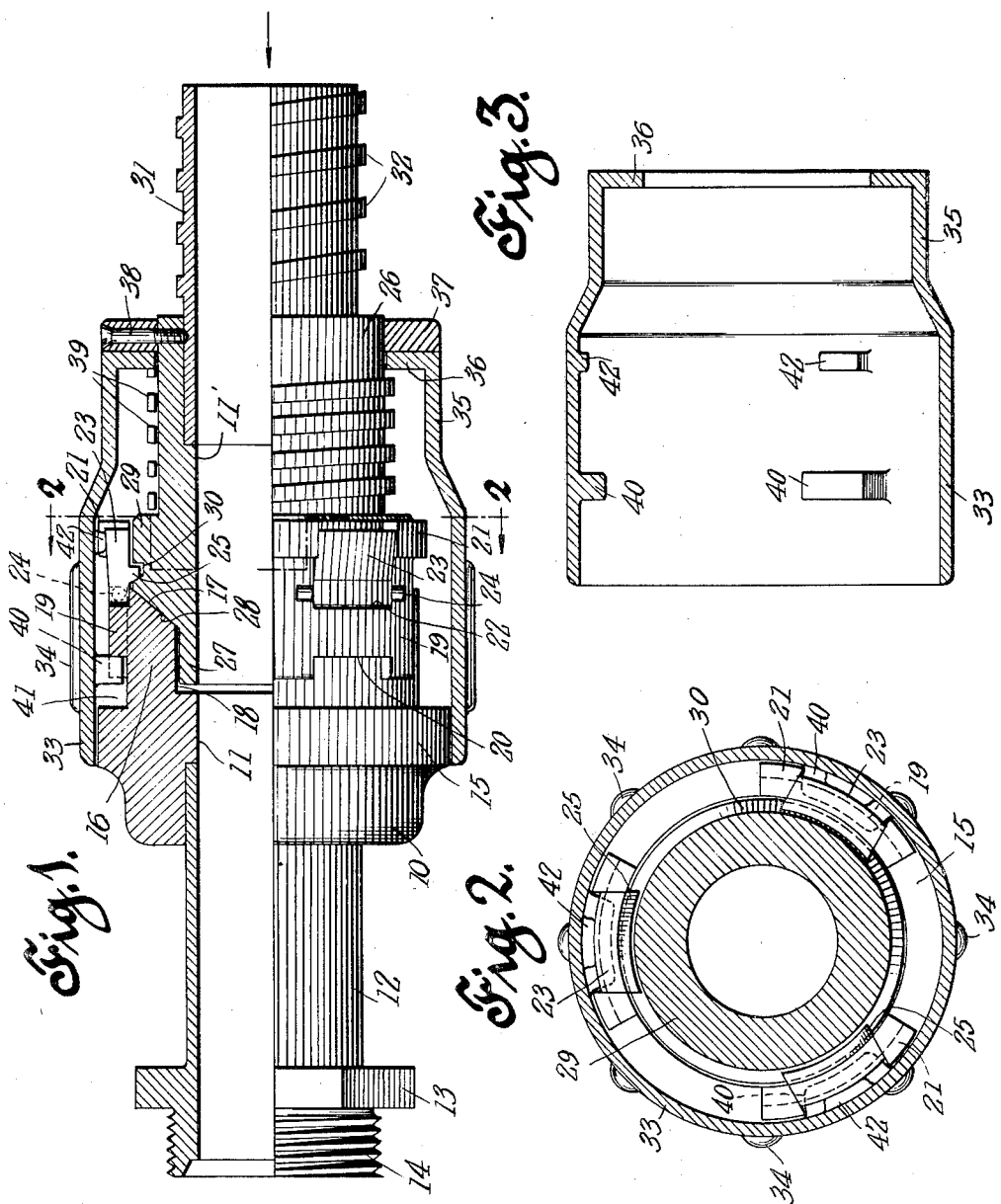
INVENTOR
Joseph L. Martin
BY
Willis & Hastings
ATTORNEYS Patented Aug. 15, 1933

1,922,968

UNITED STATES PATENT OFFICE 1,922,968

HOSE COUPLING

Joseph L. Martin, Union City, N. J.

Refiled for abandoned application Serial No. 196,646, June 6, 1927. This application October 22, 1930. Serial No. 490,345

7 Claims. (Cl. 285—191)

This invention relates to couplings for hose, pipes, tubes and similar hollow cylindrical articles, and more particularly to that type of couplings known as unions, the present application being refiled for an abandoned application, filed June 6, 1927, Serial Number 196,646, allowed Oct. 31, 1928.

Union couplings are ordinarily composed of two main parts connected by screw threads—subject to stripping, crossing and mutilation—which require tightening with a wrench to clamp the joint cones to their seats, and consume considerable time in making and breaking connections.

It is therefore an object of the present invention to provide a union coupling avoiding the use of screw threads, packings, gaskets, etc., a tight and effective metallic joint connection being made by manual means only.

A further feature is in the provision of a quickly operated coupling composed of few and simple parts cheaply constructed and highly effective when in operation.

These advantageous objects are attained by the novel construction and combination of parts hereinafter described and shown in the annexed drawing, forming a material part of this disclosure, and in which:—

Figure 1 is a partial side elevational, partial longitudinal sectional view of a coupling made in accordance with the invention.

Figure 2 is a transverse sectional view taken on line 2—2 of Figure 1.

Figure 3 is a sectional view of a locking sleeve used in connecting the main members.

Stated in general terms the coupling consists of two main members, one having a conical seat, the other member being engageable therewith, resilient means to urge the members into engagement, an encasing, axially movable sleeve, and means carried by the sleeve to positively clamp the members when in operative position.

Referring now in greater detail to the drawing, a body member, generally designated by the numeral 10, has a central passage 11, having fixed in its outer end a tubular fitting 12 provided with a wrench receiving portion 13 and terminating in screw threads 14 as shown, or other pipe connecting devices as preferred.

Protruding from the enlarged annular portion 15 of the body 10 is an extension 16 having a conical seat 17, the extension containing a counterbore 18, and on its periphery is a series of raised, equally spaced pads 19, three being shown.

These pads are generally rectangular in plan, provided with recesses 20 centrally in their edges adjacent the enlarged element 15, and their front peripheral portions 21 raised slightly above their arcuate surfaces.

The front portion of the pads contain recesses 22, directly opposite the rear recesses 20, and fitted freely in the recesses 22 are lever-like detents 23 having pintles 24 extending from their side edges to engage in notches formed in the pads at the sides of the recesses, to rock therein.

The detents 23 gradually increase in thickness from the pintle carrying portion outwardly and formed on their inner surfaces are transverse ridges 25, having bevelled faces on the sides adjacent the pintles.

The mating member 26 of the coupling has a reduced inner cylindrical portion 27 loosely extending into the counterbore 18 of the other element 10, leading to a cone 28 suited to the seat 17.

The base or outer diameter of the cone blends into a cylindrical portion 29, equal in diameter with the body extension 16, and which has formed in it an annular groove 30 receptive of the detent ridge 25.

Extending outwardly from the element 26 is a tube 31, which may be annularly, but preferably helically corrugated, as at 32, to engage within a flexible hose, or any preferred type of fitting may be used, it being understood that the passage 11 through the several elements is substantially straight, unobstructed and of uniform area.

A casing sleeve 33, provided with a plurality of elongated ridges 34 for manual operation, is adapted to extend over the body element 15, covering the joint members, and then reduced as at 35, terminating in an inreaching flange 36 which engages the reduced diameter portion 26 of the mating member.

A collar 37, held by a screw 38 on the end of the member 26 acts as an abutment or stop for the sleeve flange, limiting its outward movement as urged by an expansion spring 39 coiled around the member 26 between the flange 36 and shoulder of the cylinder 29.

Formed on the inner surface of the sleeve 33 are lugs 40 equal in number to the pads 19, between which they are passed in assemblying to enter an annular recess 41 beyond the pads, compressing the spring 39, and upon giving a partial turn to the sleeve the lugs 40 enter the pad recesses 20, locking the parts in operative position, the spring acting to maintain the cone 28 adjacent its seat 17 and also axial displacement of the sleeve and its lugs relative to the pads.

Also in the interior of the sleeve 33 is another series of lugs 42, located in such manner as to impinge upon the outer surfaces of the detents 23, and, by reason of their inclination, cause them to move inwardly on their pivots, forcing the bevelled surfaces of the ridges 25 adjacent the correspondingly bevelled wall of the groove 30, thereby positively locking the cone firmly against its seat, forming a tight metallic joint.

When the coupling is to be released the sleeve is pressed forwardly against the action of the spring until the lugs 40 have cleared the recesses in the pads 19, at which time the lugs 42 have relaxed their pressure on the detents; then by partially rotating the sleeve the several lugs may be withdrawn from between adjacent pads, permitting the detents to disengage the locking groove 30, and the elements become separated in an obvious manner.

Although the foregoing is descriptive of the best known embodiment of the invention, it is to be understood that modifications and changes may be made without departing from the scope of the appended claims when construed in the usual broad manner.

Having thus described the invention and set forth the manner of its construction and operation, what is claimed as new and sought to secure by Letters Patent, is:—

1. A hose coupling comprising a hollow body having a conical seat, a hollow cone engageable therewith, a tubular extension on said cone, a sleeve movable on said body and extension, a series of spaced pads on said body having recesses in their edges opposed to said seat, lugs interiorly of said sleeve engageable in the pad recesses, and a compression spring encircling said extension exerting pressure between said sleeve and cone whereby the cone is held against said seat.

2. A hose coupling comprising a hollow body having a conical seat, a hollow cone engageable therewith, a tubular extension on said cone, a sleeve rotatably and slidably mounted on said body, an inreaching flange on said sleeve movable on said extension, means on said extension intermediate said flange and cone to urge the cone against said seat, and pivoted means to positively interlock said sleeve and said body.

3. A hose coupling comprising a hollow body having a reduced cylindrical portion and a conical seat therein, a hollow cone engageable with said seat, a tubular extension on said cone, a casing sleeve having an inreaching flange movable on said extension and an enlarged portion enveloping said body, means to retain said sleeve on said extension, an annular groove in said extension adjacent the cone, detents pivoted in said body having ridges to engage in said groove, means to interlock said body and sleeve, and means in said sleeve to force said detent ridges into engagement with the walls of said groove.

4. A hose coupling comprising a hollow body having a conical seat, a hollow cone engageable therewith, a tubular extension on said cone, a sleeve movable on said body, an inreaching flange on said sleeve movable on said extension, means on said extension intermediate said flange and cone to urge the cone against said seat, a cylindrical head on said cone containing an annular groove, detents pivoted in said body adapted to engage in said groove, means in said sleeve to force said detents into engagement, and cooperative means to lock said sleeve on said body, said means becoming operative upon relative axial movement of the sleeve and body.

5. A hose coupling comprising a hollow body having a reduced cylindrical portion and a conical seat therein, a hollow cone engageable with said seat, a cylindrical head on said cone and a tubular extension therefrom, said head having an annular groove with at least one bevelled wall, a casing sleeve movable on said body, detents pivoted in said body adapted to engage in said groove, means in said sleeve to force said detents into engagement, and cooperative means to lock said sleeve on said body, said means becoming operative upon relative axial movement of the sleeve and body.

6. A hose coupling comprising two members, one having a hollow conical seat and the other a hollow conical plug to contact thereagainst, both members having connecting elements at their outer ends, said plug carrying member having a circumferential groove, lever-like detents pivoted in said seat member, said detents having elements to engage in the groove, a sleeve movable over said members, lugs in said sleeve to force the detents into operative engagement with one wall of the groove, said wall being bevelled, and means on said sleeve to facilitate manual movement in turning the sleeve axially with reference to said detents.

7. In a hose coupling, a locking body having a conical valve seat, a hose secured to said body, a tube forming a separate member of the coupling, a collar rigidly secured to one end of said tube, an enlarged conical portion on said tube adapted to rest on said valve seat when said tube is interlocked with said body, a cylindrical sleeve on said tube, said sleeve adapted to receive said locking body, an internal flange of said sleeve contacting said tube, a coil spring wound about said tube to yieldably retain the sleeve in retracted position on the tube, circumferentially spaced apart locking lugs projecting interiorly of said sleeve, said locking body having an annular encircling channel formed therein, circumferentially spaced apart tongues on said locking body, the lugs on said sleeve adapted to be urged over said locking body in the spaces between said tongues and to be shifted circumferentially in the annular channel, the tongues on said locking body having recesses formed therein, the recesses partly receiving the lugs of said sleeve, and said spring adapted to urge the lugs on said sleeve into the recesses of the locking body after the enlarged end of said tube has been seated upon the valve seat of said body.

JOSEPH L. MARTIN.